Dec. 16, 1924.
C. B. SNIDER
TIRE REMOVING TOOL
Filed Jan. 31, 1924
1,519,558
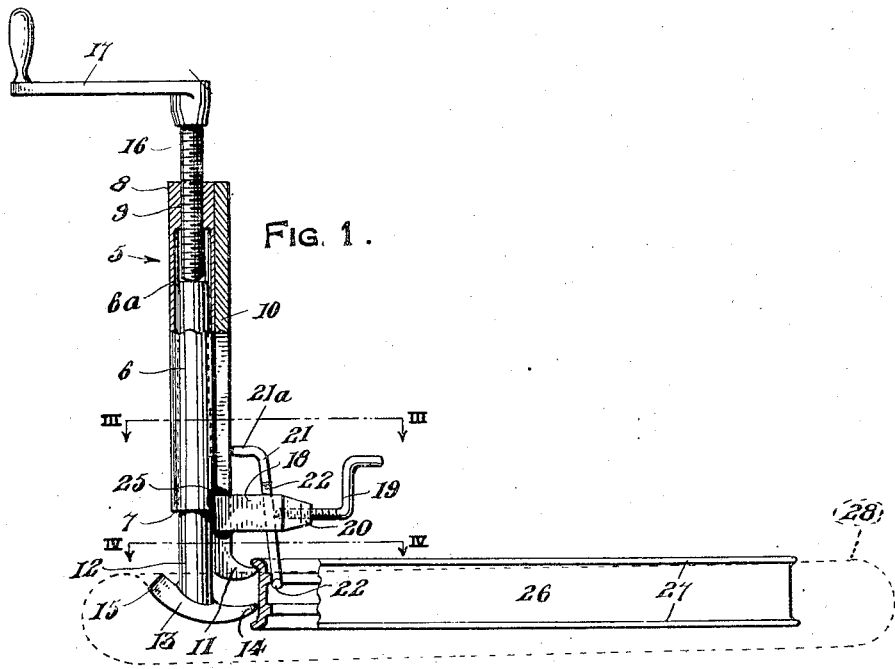
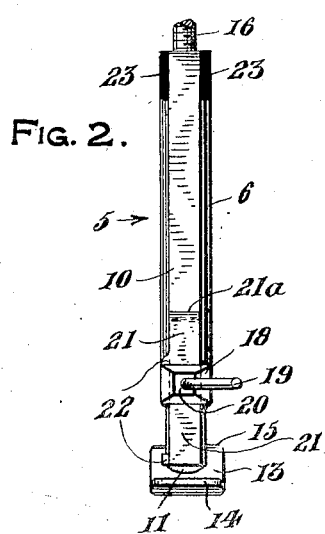
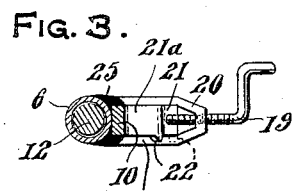
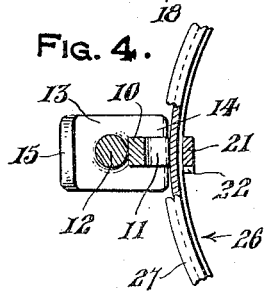
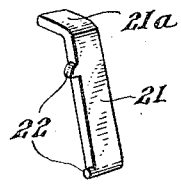
Inventor
C. B. Snider
By
F. L. Bryant,
Attorney.

Patented Dec. 16, 1924.

1,519,558

UNITED STATES PATENT OFFICE.

CLINT B. SNIDER, OF INDEPENDENCE, KANSAS.

TIRE-REMOVING TOOL.

Application filed January 31, 1924. Serial No. 689,719.

*To all whom it may concern:*

Be it known that I, CLINT B. SNIDER, a citizen of the United States of America, residing at Independence, in the county of Montgomery and State of Kansas, have invented certain new and useful Improvements in Tire-Removing Tools, of which the following is a specification.

This invention relates to new and useful improvements in tire removing tools and has particular reference to that type of tool for removing a pneumatic tire from a wheel rim.

The primary object of the invention is to provide a tire removing tool that will remove pneumatic tires from a wheel rim by securely clamping the said rim and forcibly removing the said tire therefrom.

A further object of the invention is to provide improved means for holding a wheel rim and for engaging a pneumatic tire for the purpose of forcing it from the rim.

A still further object of the invention is to provide a removable portion of the said tool that may be used, while separated from the balance of the structure, as a hammer.

The invention provides further improvements in the art, especially over the tire removing tools described in the patents issued to C. B. Snider, No. 1,475,517; 1,475,518 and 1,475,519, by greatly simplifying the structures illustrated therein and the manner of forming and assembling the various elements or portions thereof, by changing the formation of the pneumatic tire engaging portion, and by changing the shape, size, and adjustability of the movable wheel rim clamping element.

Other objects and advantages of the invention will be apparent during the course of the following description.

In the accompanying drawing forming a part of this specification and in which like numerals are employed to designate like parts throughout the same, Figure 1 is a side elevational view, partly broken away, of the tire removing tool shown in operative position in respect to a wheel rim, illustrated in full lines, and a pneumatic tire casing, illustrated in dotted lines, Figure 2 is an elevational view taken at right angles to the tool as illustrated in Fig. 1 and having a portion thereof broken away, Figure 3 is a transverse sectional view taken upon line III—III of Fig. 1, Figure 4 is a fragmentary transverse sectional view taken upon line IV—IV of Fig. 1, and Figure 5 is a detail perspective view of the movable wheel rim clamping element embodied in this invention.

In the drawing, wherein for the purpose of illustration is shown a preferred embodiment of this invention, the numeral 5 designates the frame portion of the tool which consists of a barrel portion 6 having an open lower end 7 and a solid substantially closed upper end 8 which is provided with an internally threaded bore 9. Suitably secured to the outer face of the barrel 5 and extending longitudinally thereof is a bar 10 having a length greater than the length of the barrel 6 and being provided with a clamping hook 11 formed on the lower, depending end thereof.

Slidably, removably positioned within the main bore 6ª of the barrel 6 is a rod 12 having formed on its lower end an enlarged, integral arcuate foot 13 having a flattened toe portion 14 and an enlarged heel portion 15. Threadedly engaging the screw threads formed in the bore 9 is a feed screw 16 having an operating handle 17 carried by its outer end, as illustrated. This feed screw 16 is employed for forcing the rod 12 outwardly of the barrel 6.

Suitably secured to the opposite side faces of the bar 10, in proximity to the lower end 7 of the barrel 6 is a yoke-shaped strap 18 having a feeding screw 19 threaded in an opening formed in the apex 20 of the said yoke. Longitudinally slidably and laterally movably associated with the interior of the yoke-shaped strap 18 is an inverted L-shaped clamping plate 21. This plate 21 is illustrated in detail in Fig. 5 and consists of the inwardly directed angularly arranged upper end portion 21ª and the spaced laterally projecting lugs 22. It will be seen that this inwardly projecting angularly arranged end portion 21ª is adapted to bear against the outer face of the bar 10 while the laterally projecting spaced lugs 21 limit the longitudinal sliding movement of the said clamping plate with respect to the yoke-shaped strap 18 and also prevents the removal of the said clamping plate from said yoke-shaped strap.

For the purpose of emphasizing the simplicity of the structure embodied in this invention and the manner of forming and assembling the various elements or portions thereof for enabling the tool to be cheaply manufactured, it will be noted that the barrel portion 6 of the frame 5 may be formed from a piece of solid, round stock metal and that the bores 6ª and 9 may be formed therein by employing suitable sized drills. The bar 10 may readily be formed from flat stock and the clamping hook 11 may be suitably formed on the lower end thereof by a simple forging operation. The upper ends of the barrel 6 and bar 10 may be suitably connected by spot welding, as illustrated at 23 in Fig. 2 while the lower end of the barrel 6, the adjacent portion of the bar 10, and the free ends of the yoke-shaped strap 18 may be suitably connected by spot welding, as at 25 in Figs. 1 and 3. The yoke-shaped strap 18 and inverted L-shaped clamping plate 21 may be very readily formed from ordinary flat stock metal and the feeding screw 19 may be formed from ordinary round stock by bending the same into the desired shape, as illustrated.

It is well known, to those familiar with the troubles encountered in removing pneumatic tire casings from wheel rims, that a hammer is a very useful tool to have at hand. For this reason, the rod 12 with its integral foot 13 may be removed from the barrel 6 and used as a hammer. The enlarged heel portion 15 provides a flat surface while the flattened toe portion 14 provides a different form of striking surface.

In employing the tire removing tool for the purpose described, Figure 1 shows the same in operative relation with the wheel rim 26 having the tire casing bead engaging flanges 27 formed therewith and the tire casing 28, illustrated in dotted lines, partially removed therefrom. In placing the tool in position in respect to the tire casing, fully mounted upon the wheel rim, the operating screw 19 is retarded for allowing the lower end of the inverted L-shaped clamping plate to be spaced a considerable distance from the ends of the clamping hook 11 and toe portion 14 of the foot 13. These members 11 and 14 are then closely associated with each other and positioned in engagement with the meeting edges of the tire casing 28 and the bead 27 formed on the wheel rim 26. The operating screw 19 is then fed inwardly toward the clamping plate 21 for causing the lower end of the same to be positioned in engagement with the inner surface of the wheel rim 26. By tightening down upon the screw 19, the operating edges of the clamping hook 11 and toe portion 14 are forced inwardly until the same engage the face or peripheral surface of the wheel rim 26. It will be noted that the clamping plate 21 may be longitudinally shifted for properly associating the lower end of the same with the wheel rim 26 and that the clamping plate 21 also has a lateral movement which is controlled by the feeding screw 19. After the clamping hook 11 and toe portion 14 of the foot 13 are positioned with their operative edges in engagement with the wheel rim 26, the handle 17 is operated for feeding the screw 16 downwardly against the head of the rod 12. This feeding of the rod 12 against the tire casing 28 will successfully force the same off of the wheel rim 26.

It is now believed that the construction, manner of assembling the various elements, the operation of the device, and the advantages and improvements over the prior art will be understood by those skilled in the art.

It is to be understood that the form of this invention herewith shown and described is to be taken as the preferred example of the same, and that various changes in the shape, size, and arrangement of parts may be resorted to without departing from the spirit of the invention or the scope of the subjoined claims.

Having thus described the invention, I claim:—

1. In a tire removing tool, a frame consisting of a barrel portion having a bore extending the majority of the length of the same and being open at one end, and having a reduced internally threaded bore at the opposite end, a bar secured to the outer surface of said barrel extending longitudinally thereof and projecting beyond the open end of said barrel, said projecting end being formed into a hook, a rod slidably positioned within the larger bore of said barrel, an enlarged arcuate-shaped foot carried by the projecting end of said rod, a feeding screw carried by the reduced internally threaded bore of said barrel adapted to engage the inner end of said rod for forcing the latter outwardly of said barrel, a yoke-shaped strap rigidly secured to and projecting laterally from said bar in proximity to the open end of said barrel, an angular clamping plate longitudinally and laterally adjustably carried by said yoke-shaped strap, and means carried by said strap for forcibly moving said clamping plate laterally toward said hook-shaped end of the bar.

2. In a tire removing tool, a frame, means carried by said frame for clamping the edge of a wheel rim, and means carried by said frame for forcibly removing a tire casing from said rim, said first mentioned means including a laterally projecting clamping hook rigid with the frame, a yoke-shaped strap rigid with the frame and projecting laterally beyond the rim engaging portion of said hook, a plate within said yoke capable of being adjusted laterally toward and away from the operative portion of said hook and longitudinally into and out of operative relation with said hook, an angular extension carried by said plate adapted to bear against said frame for providing a fulcrum for the plate when being adjusted laterally, and means carried by said joke for forcing the plate toward the operative portion of said hook for clamping a wheel rim edge therebetween.

In testimony whereof I affix my signature.

CLINT B. SNIDER.